United States Patent [19]

Fuhs et al.

[11] Patent Number: 5,469,446
[45] Date of Patent: Nov. 21, 1995

[54] RETRY FILTER AND CIRCULATING ECHO METHOD AND APPARATUS

[75] Inventors: Ronald E. Fuhs; William A. Hammond, Jr., both of Rochester; George W. Nation, Eyota; Steven L. Rogers; John C. Willis, both of Rochester, all of Minn.

[73] Assignee: International Business Machines Corporation, Armonk, N.Y.

[21] Appl. No.: 187,693

[22] Filed: Jan. 26, 1994

[51] Int. Cl.⁶ .............................. G08C 25/02; H04L 1/20
[52] U.S. Cl. ................... 371/33; 371/32; 370/94.1
[58] Field of Search .................. 371/32, 33; 340/825.5; 370/60, 94.1, 94.3

[56] References Cited

U.S. PATENT DOCUMENTS

| | | | |
|---|---|---|---|
| 4,567,590 | 1/1986 | Bederman | 370/86 |
| 4,739,321 | 4/1988 | Friedman et al. | 340/825.5 |
| 4,807,274 | 2/1989 | Kousa | 379/6 |
| 4,914,653 | 4/1990 | Bishop et al. | 370/85.6 |
| 4,918,687 | 4/1990 | Bustini et al. | 370/60.1 |
| 4,965,790 | 10/1990 | Nishino et al. | 370/85.12 |
| 5,036,518 | 7/1991 | Tseung | 371/32 |
| 5,101,479 | 3/1992 | Baker et al. | 395/325 |
| 5,115,433 | 5/1992 | Baran et al. | 370/94.3 |
| 5,216,670 | 6/1993 | Ofek et al. | 370/85.14 |

*Primary Examiner*—Paul P. Gordon
*Attorney, Agent, or Firm*—Joan Pennington

[57] ABSTRACT

A retry filter and circulating echo apparatus and method are provided for a digital processing system of the type having multiple nodes that communicate via one or more unidirectional rings. The nodes of a digital processing system communicate packets to each other over a unidirectional ring bus. An origination node allocates a sequence identification and transmits a packet to a destination node, which generates a first echo packet and also sets a packet filter indication to drop any further copies of that packet. The first echo packet is sent to the origination node as a confirmation. The origination node generates a second echo packet and sends the generated second echo packet onward to the destination node again as an indication that the packet will not be retransmitted. The destination node transmits a third echo packet as an indication that the sequence can be deallocated.

12 Claims, 3 Drawing Sheets

RETRY FILTER AND CIRCULATING ECHO METHOD AND APPARATUS

BACKGROUND OF THE INVENTION

1. Field of the Invention

The invention relates generally to a digital processing system for nodes that communicate via unidirectional rings, and more particularly to method and apparatus that prevents the same communication packet from being processed twice by a node.

2. Description of the prior Art

IEEE P1596 SCI (scalable coherent interface) Standards Draft specifies protocols for nodes that communicate via unidirectional rings. In normal operation, a node transmits a communication packet destined for some other node in the system. The communication packet is routed to the proper node which generates an echo packet that is transmitted back to the node that originated the communication packet. The receipt of the echo packet indicates that the communication packet was received correctly and need not be retransmitted or retried. SCI supports shared coherent memory across many nodes. Thus, many of the packets are for the purpose of transferring ownership of data items, updating or purging invalid data items. This type of shared coherent memory is very sensitive to errant commands. For example, a command that transfers ownership of data when executed twice can result in a data integrity failure. IEEE P1596 SCI Standards Draft specifies a mechanism that can insure that two copies of a packet do not exist in the system at the same time, but does not specify a mechanism or policy that prevents the same packet from being processed twice by a node or the reprocessing of a retransmitted packet. The lack of such a policy leads to data integrity failures.

A need exists for a method and apparatus that prevents a packet from being processed twice by a node and that is simple to implement.

SUMMARY OF THE INVENTION

A principal object of the present invention is to provide a method and apparatus that prevents the same packet from being processed twice by a node. Other objects are to provide such method and apparatus substantially without negative effects, and that overcome disadvantages of prior art arrangements.

In brief, the objects and advantages of the present invention are achieved by retry filter and circulating echo apparatus and method for a digital processing system of the type having multiple nodes that communicate via one or more unidirectional rings. The nodes of a digital processing system communicate data packets to each other over a unidirectional ring bus. An origination node allocates a sequence identification (ID) and transmits a packet to a destination node, which generates a first echo packet and also sets a packet filter indication to drop any further copies of that packet. The first echo packet is sent to the origination node as a confirmation. The origination node generates a second echo packet and sends the generated second echo packet onward to the destination node again as an indication that the packet will not be retransmitted.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

In accordance with the present invention, an efficient method for establishing a packet filter at a destination node is provided. The present invention provides a retry filter method and apparatus in which an echo packet is transmitted from the destination, after receiving a packet, to the sending node as confirmation. The origination or sending node generates a second echo packet sent onward to the destination node again as an indication that the packet will not be retransmitted. The packet filter is established when a new packet is received and is used to delete subsequent retransmissions of the same packet at the destination node. The packet filter prevents the re-processing of packets that otherwise could cause data integrity failures. Where normally the packet would be processed a second time, the filter mechanism of the invention causes duplicate packets to be ignored. The invention also specifies an efficient method of deleting the filter location when it is known that no further retransmissions of the packet will be forthcoming. This prevents subsequent packets from the same source node from being deleted erroneously and reduces hardware resource consumption.

Figure 1:
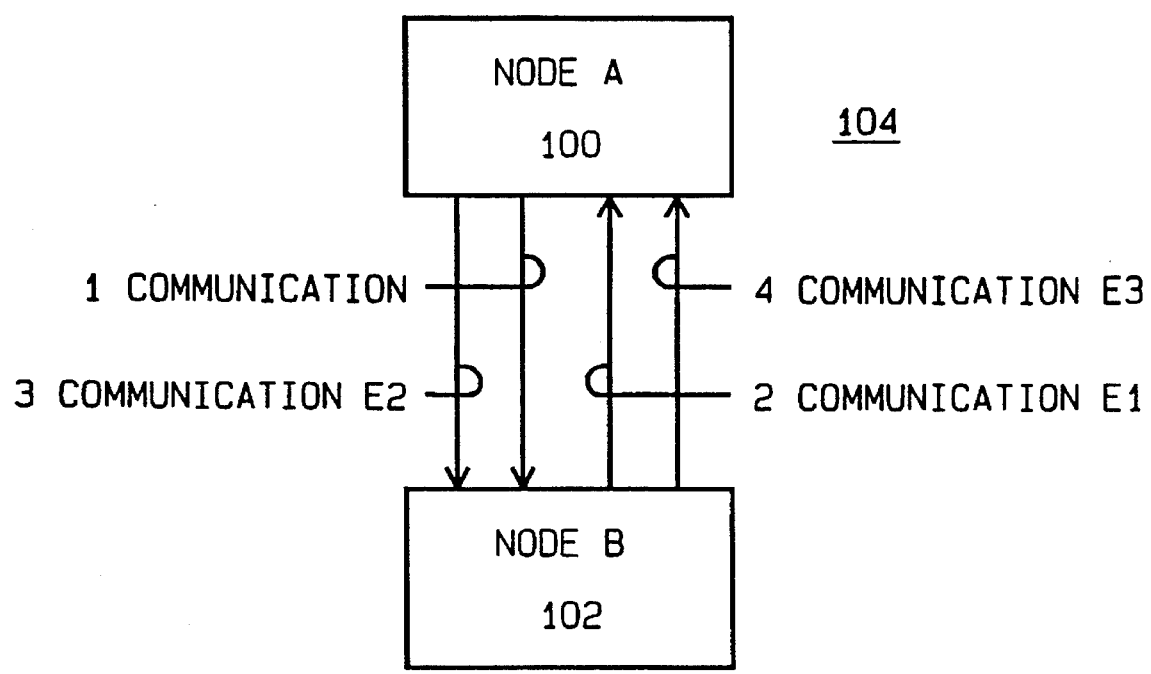
FIG. 1 is a block diagram representation of a pair of nodes in a unidirectional ring communication system embodying the invention.

In FIG. 1, there is shown a block diagram of a pair of nodes 100 and 102 in a unidirectional ring communication system generally designated as 104 illustrating an operational sequence of the invention. Node A 100 is the originator node and node B 102 is the destination node of the packets COMMUNICATION and COMMUNICATION E2. Node B 102 is the originator node and node A 100 is the destination node of the packets COMMUNICATION E1 and COMMUNICATION E3. After the initial COMMUNICATION and prior to receiving the COMMUNICATION E2, node B 102 has an active filter established for a specific sequence identification (ID) from node A 100. After the initial COMMUNICATION and prior to receiving the COMMUNICATION E3, node A 100 reserves the specific sequence identification used for the packet. When the COMMUNICATION packet is first received by node B 102, the packet filter is established by node B 102 that will cause subsequent copies of that COMMUNICATION packet to be ignored or dropped.

A packet is uniquely identified by a sequence identification (ID) defined by the catenation of the origination node ID for the transaction and the sequence number given to that transaction by that origination node. A packet filter location established by the destination node checks the sequence ID to determine the identity of a packet. The number of bits in the sequence number is not large, for example, 6 bits. As a result, these sequence numbers are quickly re-used by an originating node. The situation can occur such that a node completes a transaction with a particular sequence number and then needs to re-use that sequence number. If the E2 echo packet for the original communication packet was lost and the filter location at the other node has not been removed, then this new packet when destined for the same node will be echoed and filtered without being processed. To prevent this from occurring, an origination node does not re-use a sequence number until the E3 echo packet from the destination has returned to indicate that the filter location has been removed. Alternatively, for the case where an E2 or E3 echo packet is lost, the sequence number may be unusable for an indefinite period of time, so a timeout is established to allow the re-use of the sequence number. Such sequential operations are illustrated in FIG. 2.

A first or E1 echo packet is generated by node B 102 for the filtered packet to indicate to the sending node A 100 that the COMMUNICATION packet was received correctly and should not be retransmitted or retried. After receiving the E1 echo packet from the destination node B 102, the sending node A 100 generates and sends a second or E2 echo packet to node B 102 to indicate to the destination node that the origination node A 100 will not be retransmitting the packet and that the filter location can be deallocated. A third or E3 echo packet is generated and sent by node B 102 to node A 100 to indicate to the origination node A 100 that the reserved sequence identification can be deallocated.

Figure 2:
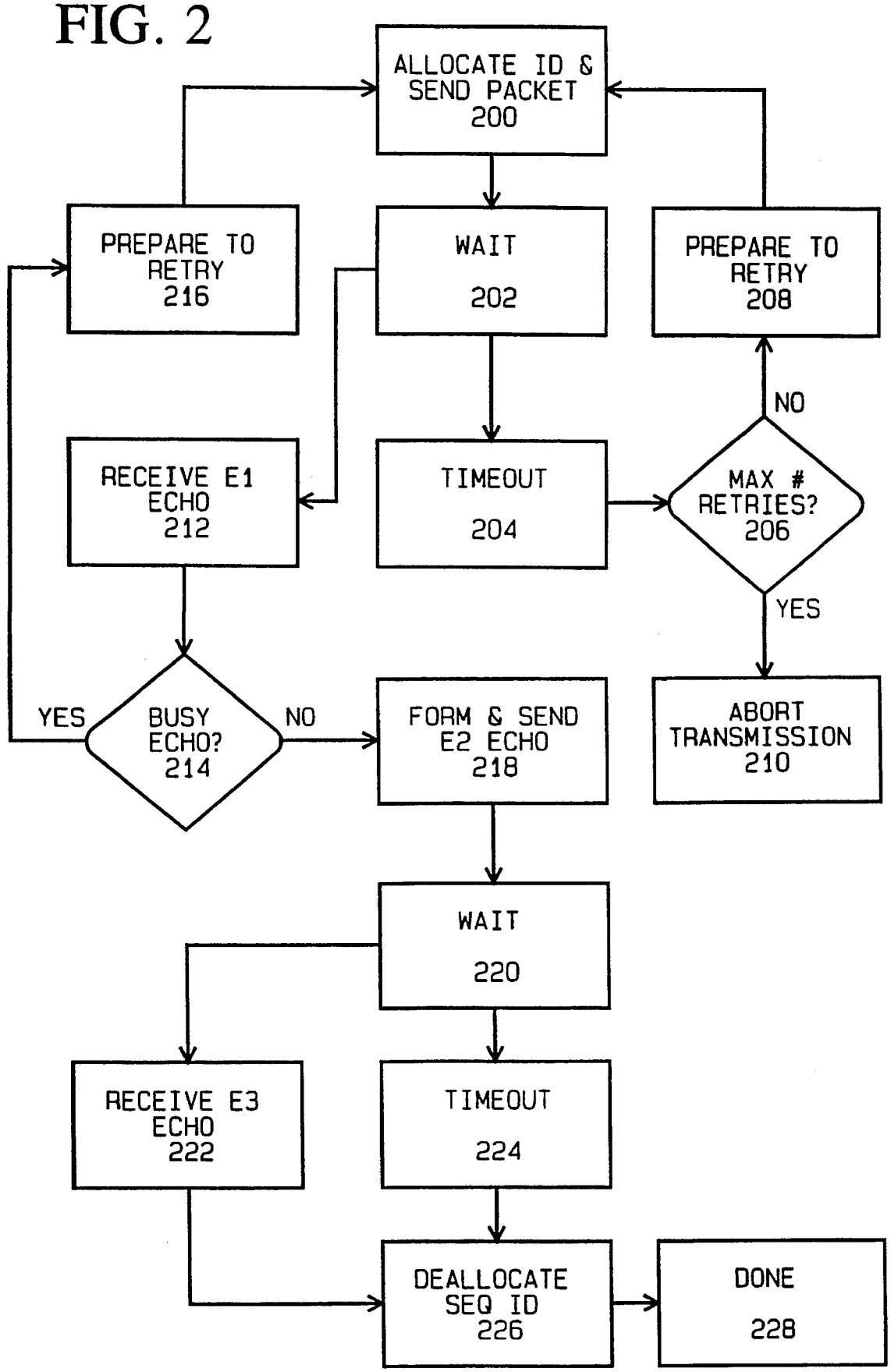
FIG. 2 is a flow chart showing sequential steps performed by an origination packet source or node of the invention.

FIG. 2 illustrates sequential steps of an origination node that begins at a block 200 with the first steps to allocate identification (ID) and send a packet. Then the sending node waits for an E1 echo packet as indicated at a block 202. When an E1 echo packet is not received from the destination node within a predetermined timeout interval as indicated at a block 204, then the sequential operations continue to prepare to send a retry packet at a block 208 until a maximum number of retries is identified at a decision block 206. When the maximum number of retries is identified at block 206, then the packet transmission is aborted at a block 210. Otherwise when an E1 echo packet is received at a block 212, then it is determined whether the received echo packet is a busy E1 echo at a decision block 214. When a busy E1 echo packet is identified at block 214, then operations continue to prepare to send a retry packet at a block 216. When the E1 echo packet is not a busy E1 echo packet indicating that the packet was accepted at the destination node, then an E2 echo packet is formed and sent to the destination node as indicated at a block 218. Then the origination node waits for an E3 echo packet from the destination node as indicated at blocks 220 and 222. After either the E3 echo packet is received or following an identified predetermined timeout interval at a block 224, then the allocated sequence ID is deallocated at a block 226 to complete sequential operations for the packet transmission by the origination node as indicated at a block 228.

Figure 3:
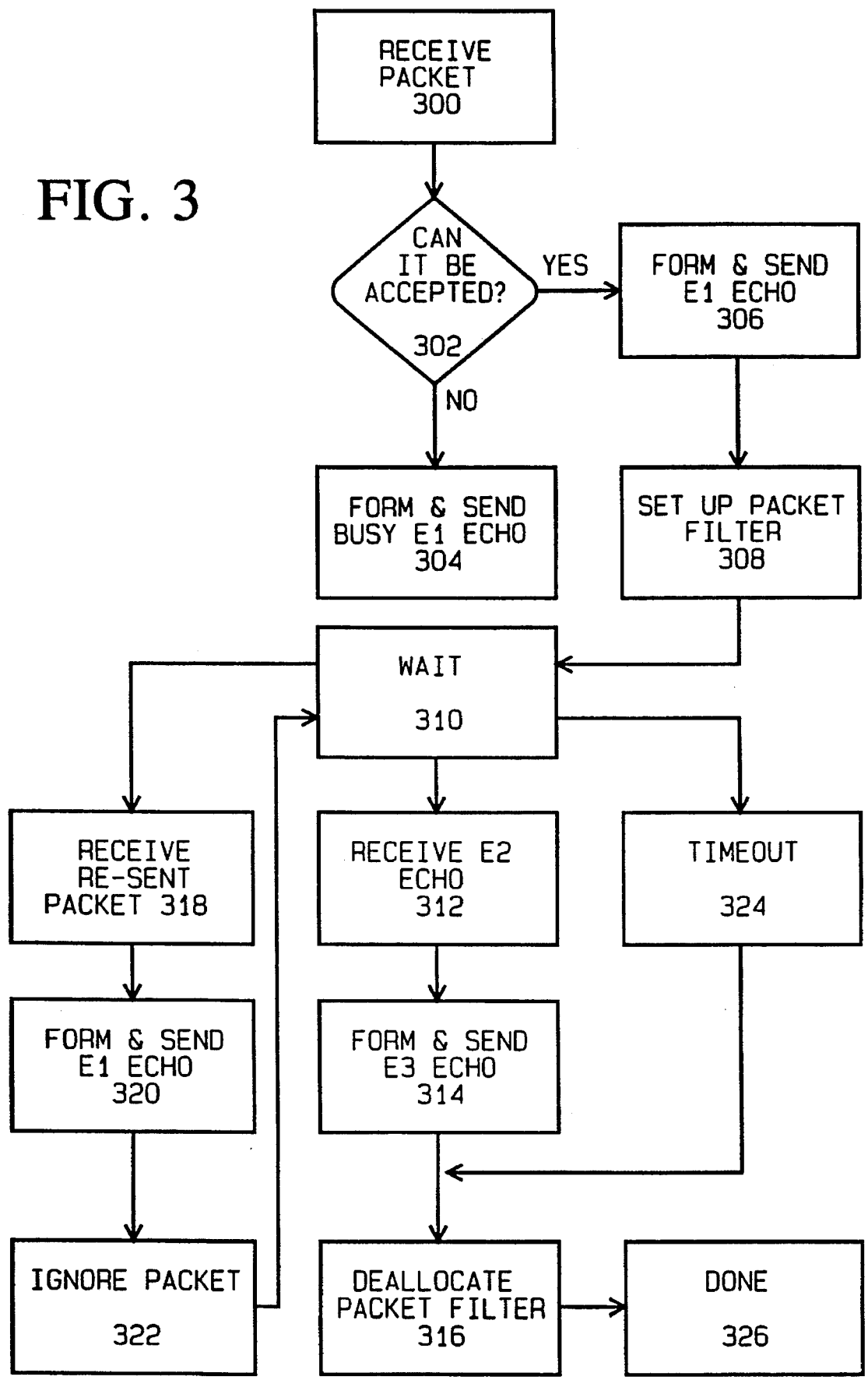
FIG. 3 is a flow chart showing sequential steps of a packet destination node of the invention.

Referring to FIG. 3, the sequential operations of a destination node are illustrated beginning with receiving a packet at a block 300. First it is determined whether the packet can be accepted at a block 302. When the packet cannot be accepted, then a busy E1 echo packet is generated and sent as indicated at a block 304. Otherwise, when the packet is accepted, then an E1 echo packet is generated and sent to the origination node as indicated at a block 306. Next a packet filter is established as indicated at a block 308. Then the destination node waits as indicated at a block 310, until an E2 echo packet is received from the origination node as indicated at a block 312. After an E2 echo packet is received, an E3 echo packet is generated and sent to the origination node as indicated at a block 314. Then the packet filter is deallocated as indicated at a block 316.

For those situations where a filter location is established at block 308 but the E1 or E2 echo packet is lost, for example, such as due to corruption, a series of events as indicated at blocks 318, 320, 322 and 324 are noted or timed to indicate that an echo packet has been lost and there will not be retries of the original packet, so that the filter location is removed. When as indicated at block 318 a re-sent packet is received, then an E1 echo packet is generated and sent at block 320. The packet is ignored as indicated at block 322 and the sequential operations continue by waiting for an E2 echo packet at block 310. When an E2 echo packet is not received and a predetermined timeout equal to the maximum sequence of timeout intervals is identified as indicated at a block 324, then the packet filter location is deallocated. Deallocating the packet filter at block 316 completes the sequential steps for a packet reception by the destination node as indicated at a block 326.

While the invention has been described with reference to details of the illustrated embodiments, these details are not intended to limit the scope of the invention as defined in the appended claims.

What is claimed and desired to be secured by Letters Patent of the United States is:

1. A method of processing packets communicated between nodes via at least one unidirectional ring, said method comprising the steps of:

allocating a sequence identification for a packet and sending said packet including said allocated sequence identification at an origination node;

receiving said packet at a destination node;

establishing a packet filter utilizing said allocated sequence identification and generating and sending a first echo packet to said origination node responsive to receiving said packet at said destination node;

receiving said first echo packet at said origination node;

generating and sending a second echo packet to said destination node responsive to said received first echo packet at said origination node;

receiving said second echo packet at said destination node; and generating and sending a third echo packet to said origination node responsive to receiving said second echo packet at said destination node.

2. A method as recited in claim 1 further includes the step of deallocating said sequence identification for said packet responsive to a predetermined timeout interval having elapsed after sending said second echo packet without receiving said third echo packet at said origination node.

3. A method as recited in claim 1 further includes the step of deallocating said established packet filter responsive to said received second echo packet at said destination node.

4. A method as recited in claim 1 further includes the step of deallocating said sequence identification for said packet responsive to said received third echo packet at said origination node.

5. A method as recited in claim 1 further includes the step of deallocating said established packet filter responsive to a predetermined timeout interval having elapsed after establishing said packet filter without receiving said second echo packet at said destination node.

6. A method as recited in claim 1 further includes the step of sending a retry packet responsive to a predetermined retry timeout interval having elapsed without receiving said first echo packet at said origination node.

7. A method as recited in claim 6 further includes the step of generating and sending a first echo packet to said origination node responsive to receiving said retry packet at said destination node.

8. A retry filter and circulating echo apparatus for a digital processing system of the type having multiple nodes that communicate via one or more unidirectional rings, said apparatus comprising:

means for allocating a sequence identification for a packet and for sending said packet including said allocated sequence identification and at an origination node;

means for establishing a packet filter and for generating and for sending a first echo packet to said origination node responsive to receiving said packet at a destination node; said packet filter for checking said allocated sequence identification and for deleting retransmissions of said packet;

means for generating and for sending a second echo packet to said destination node responsive to said received first echo packet at said origination node; and means for generating and sending a third echo packet to said origination node responsive to receiving said second echo at said destination node.

9. Apparatus as recited in claim 8 further includes:

means for deallocating said sequence identification for said packet responsive to said received third echo packet at said origination node.

10. Apparatus as recited in claim 8 further includes:

means for deallocating said sequence identification for said packet responsive to a predetermined timeout interval having elapsed after sending said second echo packet without receiving said third echo packet at said origination node.

11. Apparatus as recited in claim 8 further includes:

means for deallocating said established packet filter responsive to said received second echo packet at said destination node.

12. Apparatus as recited in claim 8 further includes:

means for deallocating said established packet filter responsive to a predefined timeout after establishing said packet filter without receiving said second echo packet at said destination node.

* * * * *